United States Patent
El-Batal et al.

(10) Patent No.: US 7,904,647 B2
(45) Date of Patent: Mar. 8, 2011

(54) SYSTEM FOR OPTIMIZING THE PERFORMANCE AND RELIABILITY OF A STORAGE CONTROLLER CACHE OFFLOAD CIRCUIT

(75) Inventors: Mohamad H. El-Batal, Westminster, CO (US); Charles E. Nichols, Wichita, KS (US); John V. Sherman, Derby, KS (US); Keith W. Holt, Wichita, KS (US); Jason M. Stuhlsatz, Alpharetta, GA (US)

(73) Assignee: LSI Corporation, Milpitas, CA (US)

( * ) Notice: Subject to any disclaimer, the term of this patent is extended or adjusted under 35 U.S.C. 154(b) by 104 days.

(21) Appl. No.: 11/604,631

(22) Filed: Nov. 27, 2006

(65) Prior Publication Data

US 2008/0126700 A1 May 29, 2008

(51) Int. Cl.
*G06F 12/00* (2006.01)
(52) U.S. Cl. ............ 711/113; 711/118; 711/E12.04
(58) Field of Classification Search .......... 711/114; 713/300, 340
See application file for complete search history.

(56) References Cited

U.S. PATENT DOCUMENTS

| | | | |
|---|---|---|---|
| 5,596,708 A | 1/1997 | Weber | 395/182.04 |
| 5,650,969 A | 7/1997 | Niijima et al. | 365/200 |
| 6,594,732 B1* | 7/2003 | Sugiyama | 711/143 |
| 2002/0087751 A1* | 7/2002 | Chong, Jr. | 710/33 |
| 2004/0049643 A1 | 3/2004 | Alavarez et al. | 711/162 |
| 2004/0078508 A1* | 4/2004 | Rivard | 711/4 |
| 2005/0010727 A1* | 1/2005 | Cuomo et al. | 711/138 |
| 2006/0015683 A1* | 1/2006 | Ashmore et al. | 711/113 |
| 2006/0107005 A1* | 5/2006 | Philippe Andre et al. | 711/162 |
| 2006/0265624 A1* | 11/2006 | Moshayedi et al. | 714/2 |
| 2007/0260827 A1* | 11/2007 | Zimmer et al. | 711/154 |

FOREIGN PATENT DOCUMENTS

| | | |
|---|---|---|
| EP | 1400899 | 3/2004 |
| GB | 2407405 | 4/2005 |

\* cited by examiner

*Primary Examiner* — Reginald G Bragdon
*Assistant Examiner* — Aracelis Ruiz
(74) *Attorney, Agent, or Firm* — Christopher P. Maiorana, PC

(57) ABSTRACT

A method for offloading a cache memory is disclosed. The method generally includes the steps of (A) reading all of a plurality of cache lines from the cache memory in response to an assertion of a signal to offload of the cache memory, (B) generating a plurality of blocks by dividing the cache lines in accordance with a RAID configuration and (C) writing the blocks among a plurality of nonvolatile memories in the RAID configuration, wherein each of the nonvolatile memories has a write bandwidth less than a read bandwidth of the cache memory.

21 Claims, 4 Drawing Sheets

US 7,904,647 B2

SYSTEM FOR OPTIMIZING THE PERFORMANCE AND RELIABILITY OF A STORAGE CONTROLLER CACHE OFFLOAD CIRCUIT

FIELD OF THE INVENTION

The present invention relates to storage controllers generally and, more particularly, to a method and/or apparatus for optimizing the performance and reliability of a storage controller cache offload circuit.

BACKGROUND OF THE INVENTION

Upon power loss of AC power, a conventional storage controller is forced to offload a cache content as quickly and reliably as possible from a cache memory to a local persistent storage device using power from a limited-reserve battery backup unit. The persistent storage device (i) is commonly local to avoid counting on remote devices to be powered up and (ii) utilizes very low amounts of power to avoid large batteries. The very low power results in the persistent storage device having a limited access bandwidth. Large batteries are very expensive and have decreasing reliability over time.

SUMMARY OF THE INVENTION

The present invention concerns a method for offloading a cache memory. The method generally comprises the steps of (A) reading all of a plurality of cache lines from the cache memory in response to an assertion of a signal to offload of the cache memory, (B) generating a plurality of blocks by dividing the cache lines in accordance with a RAID configuration and (C) writing the blocks among a plurality of nonvolatile memories in the RAID configuration, wherein each of the nonvolatile memories has a write bandwidth less than a read bandwidth of the cache memory.

The objects, features and advantages of the present invention include providing a method and/or apparatus for optimizing the performance and reliability of a storage controller cache offload circuit that may (i) arrange multiple nonvolatile memories in a RAID configuration, (ii) write two or more of the nonvolatile memories substantially simultaneously, (iii) enable a capacity expansion of the nonvolatile memories by adding more memory circuits, (iv) permit lower battery backup unit sizes compared with conventional approaches and/or (v) permit usage of super-capacitor technology as a replacement to conventional battery cells.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention generally achieves a rapid cache offload architecture using multiple nonvolatile drives in parallel. The nonvolatile drives may be arranged in a RAID configuration, such as a RAID 0 configuration, a RAID 1 configuration or a RAID 5 configuration. Other RAID configuration may be implemented to meet the criteria of a particular application. A parallel write nature of several RAID configurations generally allows for a higher performance and a higher reliability on the cache offload interface compared with the conventional techniques.

Figure 1:
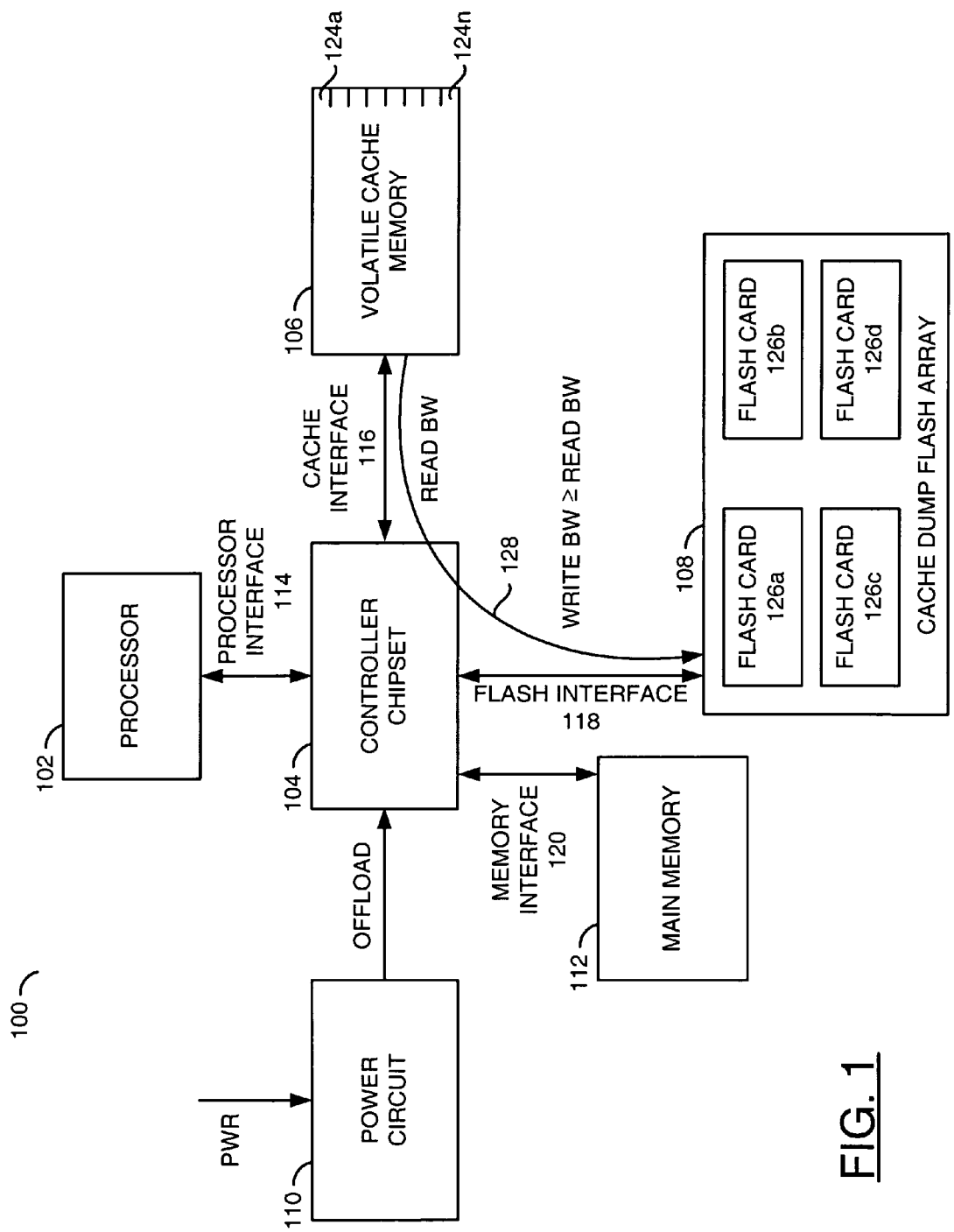
FIG. 1 is a block diagram of a system in accordance with a preferred embodiment of the present invention.

Referring to FIG. 1, a block diagram of a system 100 is shown in accordance with a preferred embodiment of the present invention. The system (or apparatus) 100 may be implemented as a cache-based processing system. The system 100 generally comprises a circuit (or module) 102, a circuit (or module) 104, a circuit (or module) 106, a circuit (or module) 108, a circuit (or module) 110 and a circuit (or module) 112. A signal (e.g., PWR) may be received by the circuit 110. A signal (e.g., OFFLOAD) may be generated by the circuit 110 and presented to the circuit 104. An interface 114 may enable the circuit 102 and the circuit 104 to communicate with each other. The circuit 104 may communicate with the circuit 106 through an interface 116. An interface 118 may permit the circuit 104 to communicate with the circuit 108. The circuit 104 may communicate with the circuit 112 through an interface 120.

The circuit 102 may be implemented as a processor circuit. The circuit 102 may be operational to perform a variety of functions by executing software programs. The circuit 102 may read and write instructions and/or data for the software programs to and from the circuits 106, 108 and 112 through the circuit 104.

The circuit 104 may be implemented as a memory controller circuit. The circuit 104 may be operational to control the circuit 106, the circuit 108 and the circuit 112. The circuit 104 may exchange the data and the instructions of the software programs with the circuit 102 through the processor interface 114. The data and the instructions may be exchanged between the circuit 104 and (i) the circuit 106 through the cache interface 116, (ii) the circuit 108 through the Flash interface 118 and (iii) the circuit 112 through the memory interface 120. The circuit 104 may be further operational to offload all of the information (e.g., data and instructions) stored in the circuit 106 into the circuit 108 through the interface 118 (see arrow 128) in response to an asserted state (e.g., a logical low) of the signal OFFLOAD.

The circuit 106 may be implemented as a volatile memory. In particular, the circuit 106 may be implemented as a volatile cache memory. The circuit 106 is generally operational to buffer the data and the instructions used and generated by the software executing in the circuit 102. The information stored in the circuit 106 may be arranged as cache lines 124a-124n. Each of the cache lines 124a-124n may be swapped with the circuit 112 based on cache hits and cache misses. The cache lines may be read from the circuit 106 at a first read bandwidth and written at a first write bandwidth.

The circuit 108 may be implemented as an array of non-volatile memories 126a-126d. The memories (or components) 126a-126d may be arranged in a RAID (Redundant Array of Independent Disks) configuration. In some embodiments, each memory "disk" 126a-126d of the circuit 108 may be implemented as a Flash memory. Other nonvolatile memory technologies may be implemented to meet the criteria of a particular application. Information may be written into each of the memories 126a-126d at a second write bandwidth and read at a second read bandwidth.

The circuit 110 may be implemented as a backup power unit. The circuit 110 may be operational to store, convert, regulate and/or filter electrical power received in the signal PWR into one or more power networks suitable for use by the circuits 102, 104, 106, 108 and 112. The circuit 110 may also be operational to provide electrical power for a limited time suitable to operate at least the circuits 104, 106 and 108 for a sufficient time to offload the information from the circuit 106 into the circuit 108. Furthermore, the circuit 110 may monitor the condition of the power flowing in via the signal PWR and assert the signal OFFLINE in response to a severe drop and/or complete loss of power in the signal PWR. In some embodiments, the circuit 110 may be implemented as one or more batteries. In at least one embodiment, the circuit 110 may be implemented as one or more super-capacitors or ultra-capacitors.

The circuit 112 may be implemented as a main memory circuit. In particular, the circuit 112 may be implemented as a volatile random access memory. The circuit 112 may be operational to store the data and the instructions for the software executing on the circuit 102. The circuit 112 may provide cache lines to the circuit 106 and receive cache lines from the circuit 106 as determined by the circuit 104.

Figure 2:
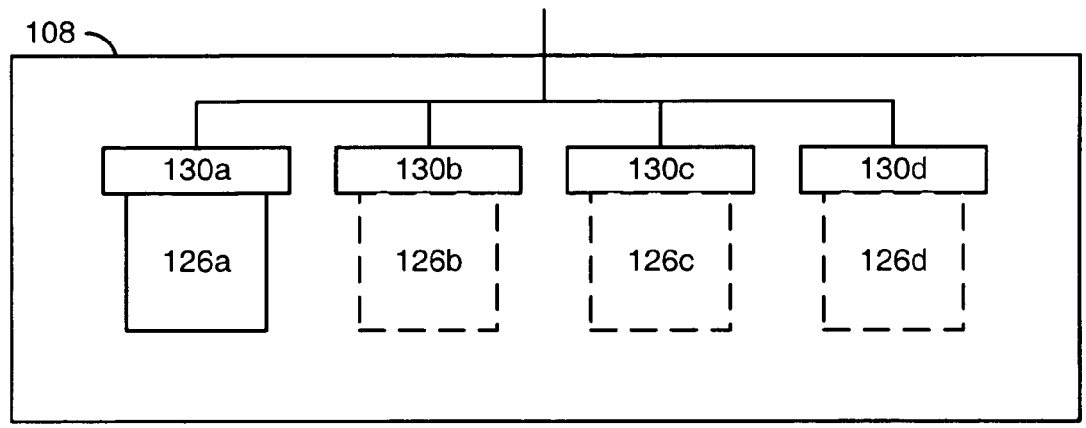
FIG. 2 is a diagram of an example implementation of a nonvolatile memory circuit.

Referring to FIG. 2, a diagram of an example implementation of the circuit 108 is shown. In addition to the memory components 126a-126d, the circuit 108 may comprise multiple sockets 130a-130d. Each of the sockets (or ports) 130a-130d is generally arranged to couple to a single memory 126a-126d. Coupling may include physical connections, electrical power connections and communication connections. In at least one configuration of the system 100, the sockets 130a-130d may be populated by a single memory component (e.g., 126a). In other configurations of the system 100, two or more memories 126a-126d may be installed in the sockets 130a-130d.

Figure 3:
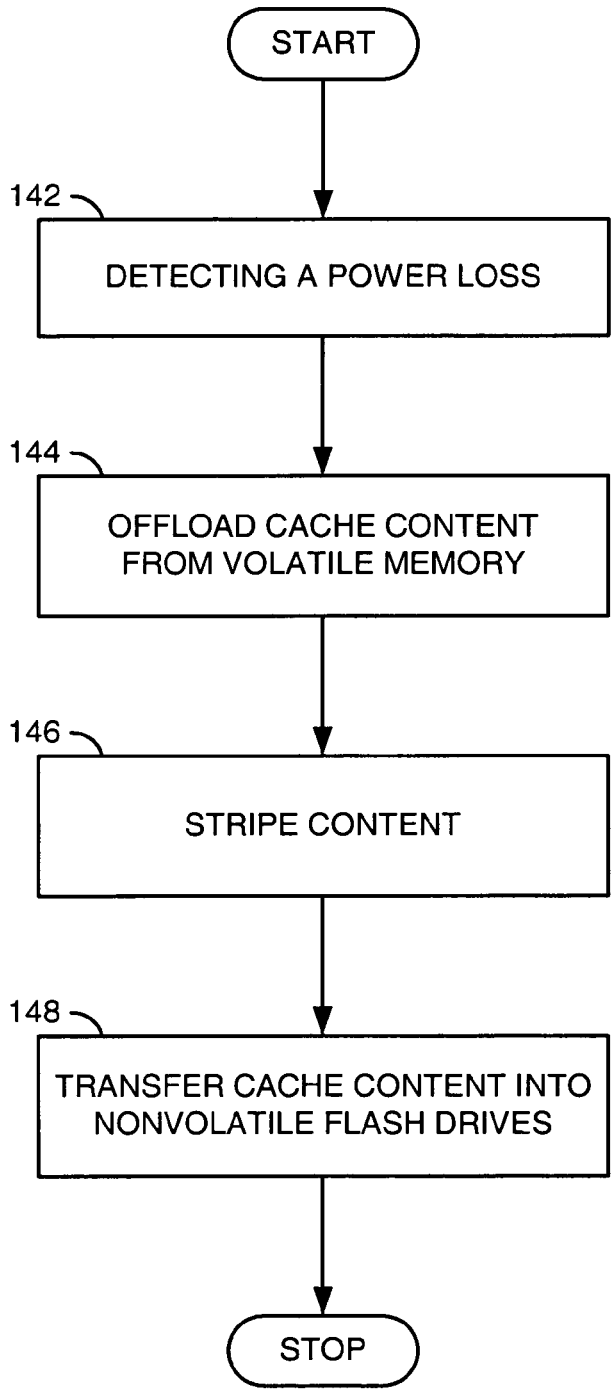
FIG. 3 is a flow diagram of an example method for offloading a cache memory.

Referring to FIG. 3, a flow diagram of an example method 140 for offloading the circuit 106 is shown. The method 140 generally implements a rapid offload method that moves data from the circuit 106 to the circuit 108. The method 140 generally comprises a step (or block) 142, a step (or block) 144, an optional step (or block) 146 and a step (or block) 148.

The method 140 may be triggered by an assertion of the signal OFFLOAD. Other triggers, such as a command from the circuit 102, may also initiate the method 140. In the step 142, the circuit 110 may assert the signal OFFLOAD upon detecting a loss of electrical power in the signal PWR. The assertion of the signal OFFLOAD may be sensed by the circuit 104. In response, the circuit 104 may read (offload) the cache lines 124a-124n from the circuit 106 in the step 144. A transfer speed of the information from the circuit 106 to the circuit 104 may be governed by a read bandwidth of the circuit 106.

Depending on the particular RAID configuration being implemented in the circuit 108, the circuit 104 may/may not stripe the information in the cache lines 124a-124n in the step 146. The blocks of information/stripes of information and error correction information (if any) may then be written to the memories 126a-126d by the circuit 104 in the step 148. A transfer speed of the blocks/stripes from the circuit 104 to the circuit 108 may be determined by write bandwidths of the memories 126a-126d.

Since the information may be written from the circuit 104 to the memories 126a-126d along multiple parallel paths substantially simultaneously, the combined write bandwidth to the memories 126a-126d may be larger (faster) than the read bandwidth from the circuit 106. The higher combined write bandwidth generally reduces a time consumed executing the transfer compared with conventional techniques. An architecture of the system 100 may utilize removable nonvolatile memory components 126a-126d at low cost.

Example memory components 126a-126d may include, but are not limited to, secure digital (SD) Flash cards and USB Flash drives.

Customer specified cache sizes for the circuit 106 have grown large in recent years. Hence, low cost nonvolatile memory choices are generally unusable due to slow write times and smaller capacities. The present invention generally uses several nonvolatile memories such that the capacity and the speed of the nonvolatile memories may be increased using RAID technology to create a virtual nonvolatile memory (circuit 108) that is larger and faster than a single common nonvolatile memory element.

By using multiple memories 126a-126d, the circuit 104 and the circuit 108 may be scaled in proportion to the amount of cache ordered by the customer. For example, the circuit 104 may support cache size options of 8 gigabytes (GB), 16 GB and 32 GB in the circuit 106. The circuit 104 may be configured to control several (e.g., four) memory components 126a-126d in the circuit 108, each with a size of 8 GB. As such, an 8 GB cache system 100 may be built with a single 8 GB memory (e.g., 126a). A 16 GB cache system 100 may be built with two 8 GB memories (e.g., 126a and 126b). A 32 GB cache system would be built with four 8 GB memories (e.g., 126a-126d).

Consider a case where each of the memories 126a-126d has an example write speed of 20 megabytes per second (MB/sec). The 8 GB cache system 100 may use approximately 8 GB/(20 MB/sec)=400 seconds to offload the 8 GB volatile circuit 106 to the 8 GB nonvolatile circuit 108. For the 16 GB cache system 100, the write bandwidth to the circuit 108 is generally doubled due to using RAID technology to configure two of the memories (e.g., 126a and 126b). A total offload time for moving information from the 16 GB circuit 106 may be 16 GB/(2×20 MB/sec)=400 seconds. The 32 GB cache system 100 may use four memory elements 126a-126d, providing an effective bandwidth of 4×20 MB/sec=80 MB/sec. The larger write bandwidth may allow a cache offload time of 32 GB/(4×20 MB/sec)=400 seconds. In all three examples, the cache offload time may be maintained at approximately 400 seconds. Larger numbers of the memory components 126a-126d may be utilized to decrease the offload time, permit larger cache sizes and/or implement other RAID configurations.

Figure 4:
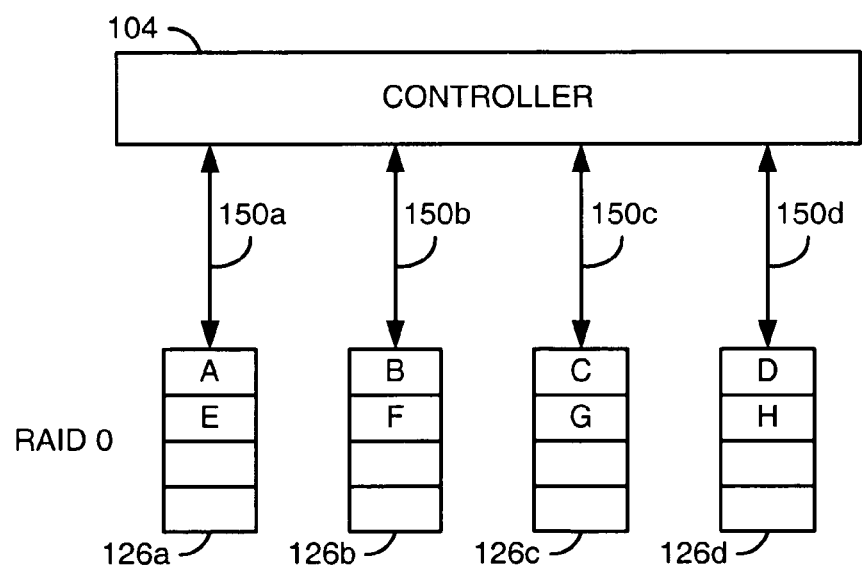
FIG. 4 is a diagram of an example RAID 0 configuration.

Referring to FIG. 4, a diagram of an example RAID 0 configuration is shown. The RAID 0 configuration may implement a striped array made from the memory components 126a-126d. The circuit 104 may group the cache lines 124a-124n read from the circuit 106 into blocks (e.g., A-H). Each of the individual blocks A-H may be written to a single memory 126a-126d, with several blocks written substantially simultaneously along parallel paths 150a-150d. For example, the circuit 104 may write the block A to the memory 126a, the block B to the memory 126b, the block C to the memory 126c and the block D to the memory 126d in parallel or in a staggered start sequence. In the stagger start sequence, the circuit 104 may begin writing the block A while still assembling the block B from the cache lines 124a-124n. Once the block B is ready, the circuit 104 may start writing the block B, continue the write of the block A and begin assembling the block C. A RAID 0 configuration is generally implemented with at least two of the memories 126a-126d.

Figure 5:
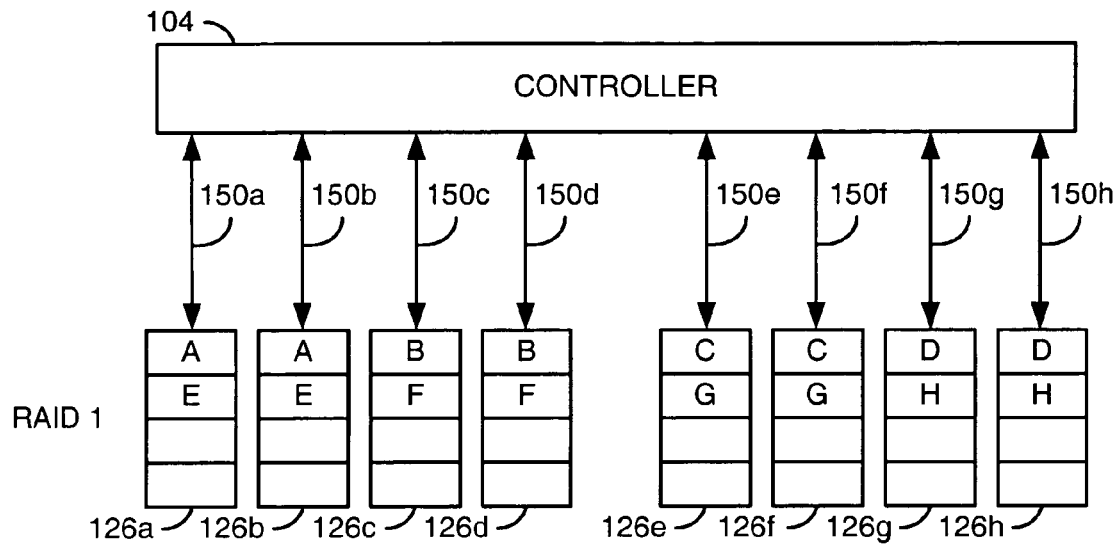
FIG. 5 is a diagram of an example RAID 1 configuration.

Referring to FIG. 5, a diagram of an example RAID 1 configuration is shown. The RAID 1 configuration generally implements duplexing of mirrored pairs using multiple (e.g., eight) of the memories 126a-126h. The circuit 104 may group the cache lines 124a-124n read from the circuit 106 into the blocks A-H. Each of the individual blocks A-H may be written to two of the memories 126a-126h, with several blocks written substantially simultaneously along the paths 150a-150h. For example, the block A may be written to both of the memories 126a and 126b, the block B may be written to both of the memories 126c and 126d, and so on. The RAID 1 configuration generally provides for fault tolerance of the stored information. For each memory pair, the blocks written into the pair may be recovered even if one of the memory components has failed. A RAID 1 configuration may be implemented with at least four of the memories 126a-126h.

Figure 6:
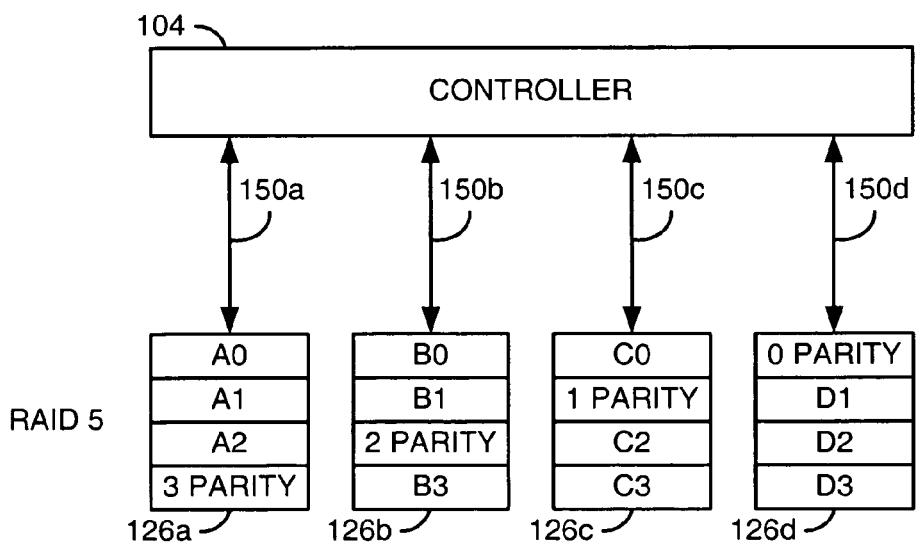
FIG. 6 is a diagram of an example RAID 5 configuration.

Referring to FIG. 6, a block diagram of an example RAID 5 configuration is shown. The RAID 5 configuration may implement data striping with distributed parity. As before, the circuit 104 may read the cache lines 124a-124n from the circuit 106 in response to assertion of the signal OFFLOAD. The read information may be assembled into the blocks A-H. Each of the blocks A-H may then be striped. For example, the block A may become stripes A0, A1 and A2, block B may become stripes B0, B1 and B3, the block C may become stripes C0, C2 and C3, the block D may become stripes D1, D2 and D3 and so on. The stripes of a given block may be written in order into a single memory 126a-126d.

A parity stripe may be calculated by the circuit 104 for all stripes in a same rank and then written into a single memory 126a-126d. For example, a zero rank parity (e.g., 0 PARITY) may be generated from the stripe A0, a stripe B0 and a stripe C0 and written into the memory 126d. A first rank parity (e.g., 1 PARITY) may be calculated for the stripe A1, a stripe B1 and a stripe D1 and written into the memory 126c. The parity calculations may continue as each new rank is written. The RAID 5 configuration generally provides an ability to recover the stored information in the event of a single memory component 126a-126d failure. The use of the distributed parity may permit efficient use of the memories 126a-126d. A RAID 5 configuration may be implemented with three or more of the memories 126a-126d. Other RAID configurations may be implemented in the circuit 108 to meet the criteria of a particular application.

The function performed by the diagrams of FIGS. 1 and 3 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method for offloading a cache memory, comprising the steps of:
   (A) exchanging a plurality of cache lines between said cache memory and a main memory directly through a controller, said main memory and said cache memory being volatile;
   (B) exchanging data between a processor and said main memory through said controller without passing through said cache memory;
   (C) buffering all of said cache lines from said cache memory in said controller in response to an assertion of a signal that indicates a loss of power;
   (D) generating a plurality of blocks in said controller by dividing said cache lines as buffered in accordance with a RAID configuration; and
   (E) writing said blocks from said controller directly to a plurality of nonvolatile memories in said RAID configuration after said loss of power, wherein each of said nonvolatile memories has (i) a write bandwidth less than a read bandwidth of said cache memory and (ii) a different independent path to said controller to convey said blocks.

2. The method according to claim 1, wherein at least two of said blocks are written substantially simultaneously to said nonvolatile memories.

3. The method according to claim 1, further comprising the step of:
   generating a plurality of stripes by striping said blocks, wherein each of said stripes includes at most a subset of a corresponding one of said blocks.

4. The method according to claim 3, wherein step (E) comprises the sub-step of:
   writing (i) said stripes and (ii) a parity of said stripes of a same rank among said nonvolatile memories.

5. The method according to claim 4, wherein at least two of said stripes are written substantially simultaneously to said nonvolatile memories.

6. The method according to claim 1, wherein (i) said assertion of said signal indicates said loss of power flowing into a power circuit and (ii) said power circuit is configured to power said controller, said cache memory and said nonvolatile memories after said loss of power.

7. The method according to claim 1, wherein (i) each of said nonvolatile memories has a first storage capacity, (ii) said cache memory has a second storage capacity and (iii) a total of said first storage capacity is at least as great as said second storage capacity.

8. The method according to claim 1, wherein a total of said write bandwidths of said nonvolatile memories is at least as great as said read bandwidth of said cache memory.

9. The method according to claim 1, wherein said cache lines are read from said cache memory at a first bandwidth proximate said read bandwidth of said cache memory.

10. The method according to claim 9, wherein said blocks are written to said nonvolatile memories at a second bandwidth proximate said write bandwidth of said nonvolatile memories.

11. A system comprising:
   a cache memory having a read bandwidth and configured to store a plurality of cache lines, said cache memory being volatile;
   a plurality of nonvolatile memories each having a write bandwidth less than said read bandwidth;

a controller configured to (i) buffer all of said cache lines received from said cache memory in response to an assertion of a signal that indicates a loss of power, (ii) generate a plurality of blocks by dividing said cache lines as buffered in accordance with a RAID configuration and (iii) write said blocks directly to said nonvolatile memories in said RAID configuration after said loss of power, wherein each of said nonvolatile memories has a different independent path to said controller to convey said blocks;

a main memory configured to exchange said cache lines with said cache memory directly through said controller, said main memory being volatile; and a processor configured to exchange first data with said main memory through said controller without passing through said cache memory.

12. The system according to claim 11, wherein at least two of said blocks are written substantially simultaneously to said nonvolatile memories.

13. The system according to claim 11, wherein processor is further configured to exchange second data with said cache memory through said controller.

14. The system according to claim 11, further comprising a power circuit configured to assert said signal.

15. The system according to claim 14, wherein said assertion of said signal indicates said loss of power flowing into said power circuit and (ii) said power circuit is further configured to power said controller, said cache memory and said nonvolatile memories after said loss of power.

16. The system according to claim 14, wherein said power circuit comprises at least one of a super-capacitor and an ultra-capacitor to deliver power after deactivation of a source power.

17. The system according to claim 11, further comprising at least four slots, each of said slots configured to connect to one of said nonvolatile memories.

18. The system according to claim 17, wherein at least one of said slots is empty in at least one configuration of said system.

19. The system according to claim 17, wherein said RAID configuration comprises one of (i) a RAID 0 configuration, (ii) a RAID 1 configuration and (iii) a RAID 5 configuration.

20. The system according to claim 11, wherein (i) said controller is further configured to generate a plurality of stripes by striping said blocks and (ii) each of said stripes includes at most a subset of a corresponding one of said blocks.

21. A system comprising:

means for volatile storage having a read bandwidth and configured to store of a plurality of cache lines;

a plurality of means for nonvolatile storage each having a write bandwidth less than said read bandwidth;

means for controlling comprising (i) buffering all of said cache lines received from said means for volatile storage in response to an assertion of a signal that indicates a loss of power, (ii) generating a plurality of blocks by dividing said cache lines as buffered in accordance with a RAID configuration and (iii) writing said blocks directly to said means for nonvolatile storage in said RAID configuration after said loss of power, wherein each of said means for nonvolatile storage has a different independent path to said means for controlling to convey said blocks;

means for main memory configured to exchange said cache lines with said means for volatile storage directly through said means for controlling; and means for processing configured to exchange data with said means for main memory through said means for controlling without passing through said means for volatile storage.

* * * * *